(12) United States Patent
Watanabe

(10) Patent No.: US 6,391,222 B1
(45) Date of Patent: May 21, 2002

(54) NIMNZN BASED FERRITE

(75) Inventor: Masahiko Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 41 days.

(21) Appl. No.: 09/680,399

(22) Filed: Oct. 5, 2000

(30) Foreign Application Priority Data

Oct. 12, 1999 (JP) .......................................... 11-289283

(51) Int. Cl.⁷ .............................. H01F 1/34; C01F 49/00
(52) U.S. Cl. .................................................. 252/62.59
(58) Field of Search ........................... 252/62.62, 62.59

(56) References Cited

FOREIGN PATENT DOCUMENTS

| JP | 58-74567 | 5/1983 |
|---|---|---|
| JP | 58-84175 | 5/1983 |
| JP | 58-84176 | 5/1983 |
| JP | 58-84177 | 5/1983 |
| JP | 58-145662 | 8/1983 |
| JP | 63-59241 | 11/1988 |
| JP | 63-59242 | 11/1988 |
| JP | 2-83218 | 3/1990 |
| JP | 10-064715 | 6/1998 |
| JP | 10-270229 | 10/1998 |
| JP | 10-270231 | 10/1998 |
| JP | 10-326706 | 12/1998 |
| JP | 11-3813 | 1/1999 |

Primary Examiner—C. Melissa Koslow
(74) Attorney, Agent, or Firm—Oblon, Spivak, McClelland, Maier & Neustadt, P.C.

(57) ABSTRACT

In NiMnZn based ferrite, main components range within the scopes of $Fe_2O_3$=53 to 59 mol %, MnO=22 to 41 mol %, ZnO=4 to 12 mol %, and NiO=2 to 7 mol %, and sub-components of said NiMnZn based ferrite range within the scopes of $SiO_2$: 0.005 to 0.03 wt %, CaO: 0.008 to 0.17 wt % and P: 0.0004 to 0.01 wt %.

21 Claims, 3 Drawing Sheets

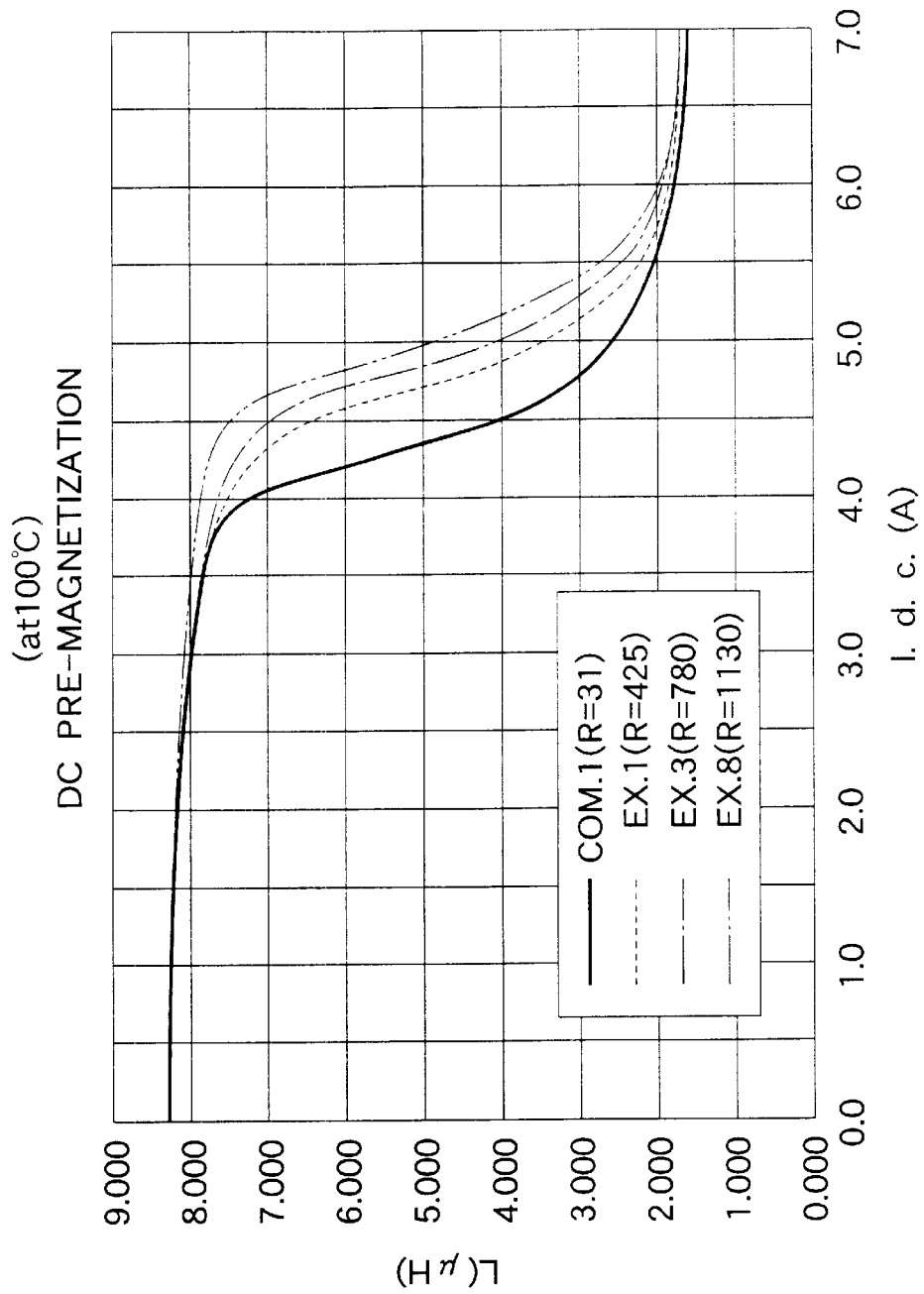

# NIMNZN BASED FERRITE

BACKGROUND OF THE INVENTION

The present invention relates to NiMnZn based ferrite applicable to cores for transformers and choke coils to be used in broad temperature ranges, and transformers and choke coils employing the same.

Mn—Zn based ferrite, comparing with other ferrite materials and soft magnetic metal materials, is small in an power loss, and is relatively large in a saturation magnetic flux density, when it is used as a core for a transformer for switching power supply to be used in frequency ranges of several tens kHz to several hundreds kHz. Accordingly it has been an important material as cores for transformers and choke coils.

However, recently, with miniaturization of electronic machines and making high power output, demands have been increased for using under conditions at high temperatures in using circumstances as parts of vehicles (at least 100° C., preferably 150° C.), and conventional ferrite materials are insufficient in the saturation magnetic flux density Bs, in particular the saturation magnetic flux density Bs in ranges at high temperature.

JP-B-63-59241 and JP-B-63-59242 disclose the ferrite materials where at least one of Ni, Mg and Li ferrites is substituted for parts of Mn—Zn based ferrite to be a low power loss under using circumstances at 150° C. or higher and high magnetic stability, but the saturation magnetic flux density Bs characteristic at high temperature is insufficient.

JP-A-2-83218 discloses NiMnZn based ferrite where the stability of magnetic characteristic is high at high temperature and under high magnetic field, the saturation magnetic flux density Bs is high and power loss is low. But the saturation magnetic flux density Bs characteristic at high temperature is insufficient.

The above mentioned conventional ferrite materials are involved with the following problems.

(1) : When ferrite materials are to be used for transformers and choke coils, in general designs are planned with respect to characteristics under possibly highest temperature condition, but any of the above conventional examples is insufficient in the saturation magnetic flux density Bs at high temperature ranges.

(2): When ferrite materials are to be used for transformers and choke coils, if the saturation magnetic flux density Bs is high and coercivity Hc is small in the relation between the saturation magnetic flux density Bs and the coercivity Hc, an initial magnetization curve of B-H loop steeply stands until a magnetic flux near a saturated condition, and as a result, DC pre-magnetization is desirable (even if DC is overlapped in the vicinity of the saturation magnetic flux density, an inductance L is not decreased), but in materials of the large coercivity Hc, the initial magnetization curve of B-H loop steeply stands at the first half thereof but at the middle, it becomes moderately oblique, and in the vicinity of the magnetic flux near the saturated condition it draws a very small slope. Therefore, if the DC pre-magnetization is evaluated, the inductance decreases before the saturation of the magnetic flux, and in spite of the high Bs characteristic, its characteristic cannot be demonstrated, and as a result, a desirable DC pre-magnetization is not available.

With respect to the saturation magnetic flux density Bs and the coercivity Hc of all of the above mentioned conventional examples, such characteristics cannot be obtained that the saturation magnetic flux density Bs is high and the coercivity Hc is small, and the desirable DC pre-magnetization is not available.

SUMMARY OF THE INVENTION

It is accordingly an object of the invention to provide NiMnZn based ferrite which is excellent in the DC pre-magnetization and low in power loss from a room temperature to around 150° C.

According to first aspect of the invention, NiMnZn based ferrite comprising: main components comprising iron oxide 53 to 59 mol % in term of $Fe_2O_3$, manganese oxide 22 to 41 mol % in trem of MnO, zinc oxide 4 to 12 mol % in term of ZnO, and nickel oxide 2 to 7 mol % in term of NiO; and sub-components comprising silicon oxide 0.005 to 0.03 wt % in term of SiO2, calcium oxide 0.008 to 0.17 wt % in term of CaO and phosphorus P 0.0004 to 0.01 wt %.

According to second aspect of the invention, NiMnZn based ferrite, main components comprising iron oxide 53 to 59 mol % in term of $Fe_2O_3$, manganese oxide 22 to 39 mol % in trem of MnO, zinc oxide 4 to 12 mol % in term of ZnO, and nickel oxide 4 to 7 mol % in term of NiO; and sub-components comprising silicon oxide 0.005 to 0.03 wt % in term of SiO2, calcium oxide 0.008 to 0.17 wt % in term of CaO and phosphorus P 0.0004 to 0.01 wt %.

In NiMnZn based ferrite as set forth in the above, at least one the following additives are added in predetermined ranges of $Nb_2O_5$: 0.005 to 0.03 wt %, $Ta_2O_5$: 0.01 to 0.08 wt %, $V_2O_5$: 0.01 to 0.1 wt %, $ZrO_2$: 0.005 to 0.03 wt %, $Bi_2O_3$: 0.005 to 0.04 wt % and $MoO_3$: 0.005 to 0.04 wt %.

In NiMnZn based ferrite as set forth in the above, an average grain size a sintered body is 6 to 25 μm.

In NiMnZn based ferrite as set forth in the above, the saturation magnetic flux density Bs (100° C.) of a sintered body is 440 mT or more.

In NiMnZn based ferrite as set forth in the above, the relation between the saturation magnetic flux density Bs (150° C.) and the coercivity HC (150° C.) of the B-H loop satisfies the condition of $R=(Bs-300)^2/Hc$, (herein $R \geq 400$).

For a transformer or a choke coil, NiMnZn based ferrite as set forth in any of the above is used.

By such structures as mentioned above, the following performance is exhibited.

In NiMnZn based ferrite, the main components range within the scopes of $Fe_2O_3$=53 to 59 mol %, MnO=22 to 41 mol %, ZnO=4 to 12 mol %, and NiO=2 to 7 mol %, and the sub-components of said NiMnZn based ferrite range within the scopes of $SiO_2$: 0.005 to 0.03 wt %, CaO: 0.008 to 0.17 wt % and P: 0.0004 to 0.01 wt %. Therefore, the saturation magnetic flux density Bs is 440 mT or more, and DC pre-magnetization is excellent. Thus, the present NiMnZn based ferrite material can be used in broad temperature ranges.

In NiMnZn based ferrite, the main components range within the scopes of $Fe_2O_3$=53 to 59 mol %, MnO=22 to 39 mol %, ZnO=4 to 12 mol %, and NiO=4 to 7 mol %, and the sub-components of said NiMnZn based ferrite range within the scopes of $SiO_2$: 0.005 to 0.03 wt %, CaO: 0.008 to 0.17 wt % and P: 0.0004 to 0.01 wt %. Therefore, the characteristic of the saturation magnetic flux density Bs is more improved and DC pre-magnetization is excellent. Thus, the present NiMnZn based ferrite material can be used in broad temperature ranges.

In NiMnZn based ferrite, one or two or more of the following additives are added in predetermined ranges of $Nb_2O_5$: 0.005 to 0.03 wt %, $Ta_2O_5$: 0.01 to 0.08 wt %, $V_2O_5$: 0.01 to 0.1 wt %, $ZrO_2$: 0.005 to 0.03 wt %, $Bi_2O_3$: 0.005 to 0.04 wt % and $MoO_3$: 0.005 to 0.04 wt %. Therefore, the saturation magnetic flux density Bs is 450 mT or more, and the DC pre-magnetization is more excellent. Thus, the present NiMnZn based ferrite material is low in the power loss.

In the above NiMnZn based ferrite, the average grain size of the sintered body is 6 to 25 μm. Therefore, the present NiMnZn based ferrite is of the small coercivity Hc, the saturation magnetic flux density Bs of 440 mT or more, and the low power loss.

Further, in the present NiMnZn based ferrite, the saturation magnetic flux density Bs (100° C.) of the sintered body is 440 mT or more. Therefore, the DC pre-magnetization is excellent.

In the present NiMnZn based ferrite, the relation between the saturation magnetic flux density Bs (150° C.) and the coercivity Hc (150° C.) of the B-H loop satisfies the condition of $R=(Bs-300)^2/Hc$, (herein $R \geq 400$). Therefore, the DC pre-magnetization is excellent where a value of R ($R \geq 400$) is a parameter.

For transformers or choke coils, the present NiMnZn based ferrite is used. Therefore, it is possible to produce the transformer or the choke coil having the excellent DC pre-magnetization and applicable to broad temperature ranges.

BRIEF DESCRIPTION OF THE DRAWINGS

FIG. 2 is an explanatory view of the relation between the value of R and the DC pre-magnetization.

DETAILED DESCRIPTION OF THE PREFERRED EMBODIMENTS

Figure 1:
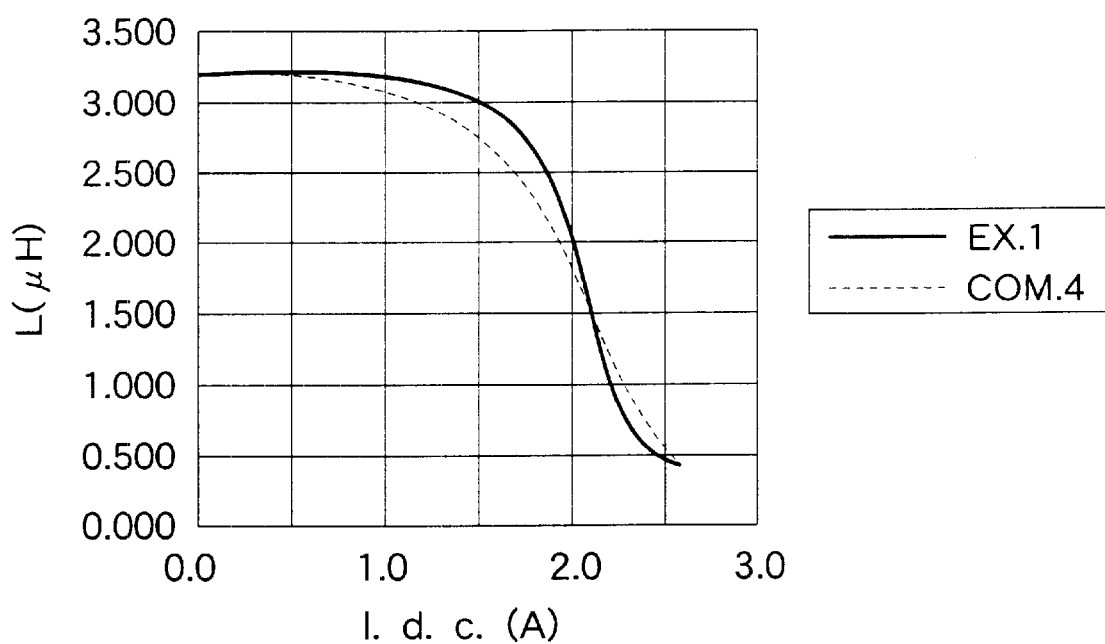
FIG. 1 is an explanatory view of the DC pre-magnetization.

Explanation will be made to the mode for carrying out the invention with reference to Tables 1 and 2 as well as FIGS. 1 to 3.

The invention controls the main components of NiMnZn based ferrite to fall in the range where a Curie temperature is high and the coercivity (Hc) of the B-H loop is small, controls P giving influences to a structure of crystal grain during a sintering procedure as well as $SiO_2$ and CaO being the sub-components to be within predetermined contents, and controls the average grain size of the sintered body to be within a predetermined range, thereby to provide NiMnZn based ferrite where the density of the body is high and the DC pre-magnetization is excellent of the small coercivity (Hc) and the saturation magnetic flux density Bs (100° C.) of 440 mT or more. Further, the invention controls the range of the main components where the temperature showing a minimum value of a temperature characteristic in the power loss is around 100 to around 150° C., and controls the average grain size of the sintered body to be within the predetermined range, thereby to provide NiMnZn based ferrite where the power loss is low at the room temperature to around 150° C.

With respect to the above mentioned invention, this invention controls the additives to be the predetermined contents, thereby to provide NiMnZn based ferrite where the density of the sintered body is higher, the DC pre-magnetization is more excellent of the small coercivity (Hc) and the saturation magnetic flux density Bs (100° C.) of 450 mT or more, and the power loss is low.

Explanation by the Example

Table 1 shows NiMnZn ferrite based ferrite materials (main components, sub-components, additives), average grain sizes of their sintered bodies, the electromagnetic characteristics and R-values. In the same, "Com." designates comparative examples, and "Ex." designates examples.

The respective components were weighed, mixed, calcinated, and pulverized to be main components, sub-components and additives shown in Table 1, and added with binders to be granules so as to form toroidal shaped samples. The samples were heated at 300° C./hr and sintered at 1210 to 1400° C., and cooled to the room temperature at 200° C./hr after the stable temperature. An atmosphere from the stable temperature and the room temperature was determined in accordance with an equilibrium oxygen partial pressure of ferrite.

The saturation magnetic flux density Bs (100° C., 150° C.), the coercivity Hc (150° C.), the power loss (room temperature RT, 100° C., 150° C.) at 40 kHz to 200 mT, and average grain size of these samples were respectively measured.

A calculation formula for calculating from the B-H loop was devised as follows, and the characteristic values (R) to be parameters of the DC pre-magnetization of the present samples were calculated thereby. The results are shown in Table 1.

$$R=(Bs-300)^2/Hc \qquad (1)$$

herein, Bs: (mT) at 150° C., and Hc: (A/m) at 150° C.

In the table 1, NiMnZn ferrite based ferrite materials (main components, sub-components, additives), average grain sizes of their sintered bodies, electromagnetic characteristics and R-values are shown. In the table, "Com." indicates comparative example, "Ex." example, and "A" average grain sizes.

TABLE 1

| | Main Components (mol %) | | | | Sub-component (wt %) | | | Additives (we %) | | | | | | A |
|---|---|---|---|---|---|---|---|---|---|---|---|---|---|---|
| | $Fe_2O_3$ | MnO | ZnO | NiO | $SiO_2$ | CaO | P | $Nb_2O_5$ | $Ta_2O_5$ | $V_2O_5$ | $ZrO_3$ | $Bi_2O_3$ | $MoO_3$ | (.m) |
| COM1 | 53.1 | 35.4 | 11.5 | 0 | 0.015 | 0.084 | 0.0028 | — | — | — | — | — | — | 12 |
| COM2 | 54.6 | 38.2 | 6.0 | 1.2 | 0.015 | 0.084 | 0.0028 | — | — | — | — | — | — | 12 |
| EX.1 | 54.3 | 33.2 | 10.2 | 2.3 | 0.015 | 0.084 | 0.0070 | — | — | — | — | — | — | 16 |
| COM3 | 54.2 | 29.7 | 13.0 | 3.1 | 0.015 | 0.084 | 0.0028 | — | — | — | — | — | — | 12 |
| EX2 | 56.0 | 34.6 | 5.8 | 3.6 | 0.015 | 0.084 | 0.0010 | — | — | — | — | — | — | 17 |
| COM4 | 57.0 | 35.8 | 3.1 | 4.1 | 0.015 | 0.084 | 0.0028 | — | — | — | — | — | — | 12 |
| EX.3 | 56.2 | 29.2 | 10.0 | 4.6 | 0.018 | 0.084 | 0.0028 | — | — | — | — | — | — | 14 |

TABLE 1-continued

| | | | | | | | | | | | | | | |
|---|---|---|---|---|---|---|---|---|---|---|---|---|---|---|
| COM5 | 56.2 | 29.2 | 10.0 | 4.6 | 0.018 | 0.084 | 0.0028 | — | — | — | — | — | — | 5 |
| COM6 | 56.2 | 29.2 | 10.0 | 4.6 | 0.018 | 0.084 | 0.0070 | — | — | — | — | — | — | 35 |
| COM7 | 56.2 | 29.2 | 10.0 | 4.6 | 0.035 | 0.084 | 0.0028 | — | — | — | — | — | — | 48 |
| COM8 | 56.2 | 29.2 | 10.0 | 4.6 | 0.018 | 0.196 | 0.0028 | — | — | — | — | — | — | 30 |
| COM9 | 56.2 | 29.2 | 10.0 | 4.6 | 0.018 | 0.084 | 0.0120 | — | — | — | — | — | — | 45 |
| COM10 | 56.2 | 29.2 | 10.0 | 4.6 | 0.018 | 0.084 | 0.0002 | — | — | — | — | — | — | 8 |
| EX.4 | 56.2 | 30.7 | 8.8 | 4.3 | 0.020 | 0.084 | 0.0005 | — | — | — | — | — | — | 12 |
| EX.5 | 57.2 | 31.9 | 6.0 | 4.9 | 0.022 | 0.067 | 0.0005 | — | — | — | — | — | — | 12 |
| COM11 | 59.8 | 30.2 | 4.5 | 5.5 | 0.015 | 0.084 | 0.0028 | — | — | — | — | — | — | 12 |
| EX.6 | 57.1 | 25.3 | 11.6 | 6.0 | 0.013 | 0.118 | 0.0028 | — | — | — | — | — | — | 12 |
| COM12 | 58.2 | 26.7 | 7.6 | 7.5 | 0.015 | 0.084 | 0.0028 | — | — | — | — | — | — | 12 |
| EX.7 | 56.8 | 28.9 | 9.1 | 5.2 | 0.020 | 0.078 | 0.0008 | — | — | — | — | — | — | 11 |
| EX.8 | 56.8 | 28.9 | 9.1 | 5.2 | 0.010 | 0.050 | 0.0008 | 0.015 | — | — | — | — | — | 12 |
| EX.9 | 56.8 | 28.9 | 9.1 | 5.2 | 0.010 | 0.050 | 0.0008 | — | 0.03 | — | — | — | — | 12 |
| EX.10 | 56.8 | 28.9 | 9.1 | 5.2 | 0.015 | 0.084 | 0.0008 | — | — | 0.05 | — | — | — | 13 |
| EX.11 | 56.8 | 28.9 | 9.1 | 5.2 | 0.010 | 0.050 | 0.0008 | — | — | — | 0.025 | — | — | 12 |
| EX.12 | 56.8 | 28.9 | 9.1 | 5.2 | 0.020 | 0.090 | 0.0008 | — | — | — | — | 0.015 | — | 13 |
| EX.13 | 56.8 | 28.9 | 9.1 | 5.2 | 0.020 | 0.090 | 0.0008 | — | — | — | — | — | 0.03 | 12 |
| EX.14 | 56.8 | 28.9 | 9.1 | 5.2 | 0.020 | 0.090 | 0.0008 | — | — | — | — | 0.02 | 0.02 | 15 |
| EX.15 | 56.8 | 28.9 | 9.1 | 5.2 | 0.010 | 0.050 | 0.0008 | 0.005 | 0.02 | 0.005 | — | — | — | 13 |
| EX.16 | 56.8 | 28.9 | 9.1 | 5.2 | 0.010 | 0.050 | 0.0008 | — | 0.02 | 0.02 | — | — | — | 13 |
| EX.17 | 56.8 | 28.9 | 9.1 | 5.2 | 0.010 | 0.050 | 0.0008 | — | 0.04 | — | 0.01 | — | — | 14 |
| EX.18 | 56.8 | 28.9 | 9.1 | 5.2 | 0.010 | 0.050 | 0.0008 | 0.02 | — | 0.04 | 0.01 | — | — | 14 |
| EX.19 | 56.8 | 28.9 | 9.1 | 5.2 | 0.010 | 0.050 | 0.0008 | — | 0.01 | 0.06 | — | 0.005 | 0.01 | 15 |

| | Bs (100° C.) (mT) | Bs (150° C.) (mT) | HC (150° C.) (A/m) | Pcv (kW/m$^2$): 40 kHz–200 mT | | | |
|---|---|---|---|---|---|---|---|
| | | | | R | RT | 100° C. | 200° C. |
| COM1 | 395 | 315 | 7.16 | 31 | 268 | 122 | 214 |
| COM2 | 432 | 343 | 6.9 | 268 | 351 | 132 | 189 |
| EX.1 | 440 | 347 | 5.2 | 425 | 422 | 135 | 215 |
| COM3 | 395 | 306 | 5.0 | 7 | 253 | 98 | 192 |
| EX2 | 450 | 382 | 12.3 | 547 | 405 | 194 | 324 |
| C0M4 | 440 | 374 | 21.1 | 260 | 563 | 311 | 574 |
| EX.3 | 450 | 380 | 8.2 | 780 | 370 | 196 | 258 |
| C0M5 | 427 | 355 | 26.7 | 113 | 342 | 177 | 229 |
| C0M6 | 426 | 357 | 12.3 | 264 | 602 | 299 | 377 |
| C0M7 | 421 | 350 | 15.4 | 162 | 957 | 613 | 922 |
| C0M8 | 411 | 342 | 19.3 | 91 | 455 | 206 | 291 |
| C0M9 | 432 | 362 | 14.8 | 260 | 867 | 538 | 853 |
| COM10 | 435 | 363 | 20.3 | 196 | 320 | 152 | 238 |
| EX.4 | 448 | 382 | 9.7 | 693 | 398 | 184 | 269 |
| EX.5 | 465 | 398 | 14.1 | 681 | 471 | 308 | 423 |
| COM11 | 468 | 402 | 28.5 | 365 | 895 | 562 | 703 |
| EX.6 | 448 | 371 | 8.3 | 607 | 398 | 205 | 305 |
| COM12 | 478 | 408 | 29.6 | 394 | 1020 | 677 | 550 |
| EX.7 | 460 | 390 | 9.7 | 835 | 439 | 231 | 345 |
| EX.8 | 471 | 398 | 8.5 | 1130 | 398 | 195 | 267 |
| EX.9 | 473 | 400 | 8 2 | 1220 | 385 | 188 | 255 |
| EX.10 | 475 | 401 | 8.2 | 1244 | 405 | 212 | 323 |
| EX.11 | 470 | 399 | 8.4 | 1167 | 395 | 205 | 288 |
| EX.12 | 469 | 399 | 9.1 | 1077 | 455 | 252 | 370 |
| EX.13 | 466 | 397 | 9.0 | 1045 | 480 | 292 | 403 |
| EX.14 | 473 | 400 | 8.9 | 1124 | 451 | 247 | 359 |
| EX.15 | 473 | 401 | 8.1 | 1259 | 383 | 189 | 248 |
| EX.16 | 472 | 400 | 8.0 | 1250 | 390 | 187 | 251 |
| EX.17 | 473 | 400 | 8.5 | 1176 | 406 | 215 | 333 |
| EX.18 | 475 | 403 | 8.1 | 1310 | 400 | 221 | 354 |
| EX.19 | 468 | 398 | 8.3 | 1157 | 432 | 231 | 355 |

Formula (1) is a value to be a parameter of the DC pre-magnetization. It was seen that the large R, the more preferable the DC pre-magnetization. The Bs characteristic at 150° C. of MnZn based ferrite generally used nowadays was around 300 mT at the most, and a term of $(Bs-300)^2$ of the formula (1) squared the difference in relation with the Bs characteristic of NiMnZn based ferrite of the invention. The remaining "/Hc" is a term showing a linear extension of the inductance characteristic with respect to the current value in the DC pre-magnetization.

In the invention, the relation between the samples of the B-H loop characteristics having various shapes and the DC pre-magnetization was studied. As a result, in the samples of the high saturation magnetic flux density Bs and the small coercivity Hc, the initial magnetization curve of the B-H loop steeply stands until the magnetic flux near the saturated condition, and consequently the DC pre-magnetization is desirable, but in the sample of the large coercivity Hc, it stands steeply at the first half of the initial magnetization curve but at the middle, it becomes moderately oblique, and in the vicinity of it draws a small curveslope.

Therefore, if the DC pre-magnetization is evaluated, the inductance decreases before the saturation of the magnetic flux, and in spite of the high Bs characteristic, its characteristic cannot be demonstrated, and as a result, a desirable DC pre-magnetization is not available.

Table 2 shows the characteristics of the saturation magnetic flux density Bs and the coercivity Hc at 100° C. of the materials of Example 1 and Comparative Example 4.

TABLE 2

Bs and Hc characteristics (at 100° C.) of Example 1 and Comparative Example 4.

| Samples | Bs (mT) | Hc (A/m) |
| --- | --- | --- |
| Example 1 | 440 | 7.5 |
| Comparative Example 4 | 440 | 20.6 |

FIG. 1 is an explanatory view of the DC pre-magnetization, showing the DC pre-magnetization of the transformers made with the material of Table 2. From the same, it is seen that the materials of the Example 1 and the Comparative example 4 are equivalent in the characteristics of the saturation magnetic flux density Bs, but the material of the Comparative example 4 of the large coercivity Hc is small in a DC current value I.d.c. where the inductance L starts to decrease, and the DC current value where the value of the inductance L before the DC current is overlapped decreases by 10%, is around 1.4(A). On the other hand, with respect to the material of the Example 1 of the small coercivity Hc, the DC current value where the value of the inductance L decreases by 10% is around 1.75(A) and the DC pre-magnetization extends than that of the Comparative example 4.

From these data, it is seen that with respect to the DC pre-magnetization, not depending on the characteristic only of the saturation magnetic flux density Bs, the relation between the saturation magnetic flux density Bs and the coercivity Hc is important, and especially, in materials to be used in broad temperature ranges, it is necessary that the value of R of the formula (1) is large.

FIG. 2 is an explanatory view of the relation between the R-value and the DC pre-magnetization, showing the DC pre-magnetization of the transformers at 100° C. made with the materials of the Comparative example 1 and the Examples 1, 3 and 8. From the same, it is seen that the DC pre-magnetization goes up as the R-values become larger along 31, 425, 780 and 1130. In the existing ferrite materials, it is difficult that the R-value reaches a value above 400. Those of the R-values being 400 or higher are of the invention.

The sintered ferrite of the sample is mirror-ground, etched with hydrofluoric acid, and photographed at the ground face with an optical microscope of 500 magnification. An average grain size is investigated based on the photograph of this optical microscope. On the photograph taken as above, a square section where grains of around 100 pieces get in, for example, 200 $\mu m \times 200$ $\mu m$, is made, and the number of grains existing in this section is counted, provided that crystal grains existing at boundaries are counted as ½ pieces. Assuming that this number is n, the average grain size d is calculated by the following formula.

$$d = \sqrt{\left(\frac{4}{\pi}\right) \times \left(\frac{40000 \ \mu m^2}{n}\right)} \quad (2)$$

The ferrites, in which the main components fall within the predetermined range as shown in the Examples 1 to 19, the sub-components exist within the predetermined range, and the average grain size of the sintered body is 6 to 25 $\mu m$, are controlled in such manners that R is 400 or more, the power loss Pcv is 500 kW/m³ or less at the room temperature to 150° C. and the saturation magnetic flux density Bs (100° C.) is 440 mT or more.

However, in the ferrite where the average grain size of the sintered body is 6 $\mu m$ or smaller as the Comparative example 5, the coercivity Hc is large, and the saturation magnetic flux density Bs (1000) is 440 mT or less. Further, in the ferrite where the average grain size of the sintered body is 25 $\mu m$ or larger as the Comparative example 6, R is below 400, and the characteristic of low power loss cannot be got. If the average grain size is 25 $\mu m$ or larger, the grain can be made grow without causing abnormal growth by the sintering condition, and R can be controlled to be a relatively preferable value, but taking into consideration an increase of the power loss in the using frequency range and sintering cost, the range of the average grain size of the invention is preferable.

In the ranges where the content of $Fe_2O_3$ of the main components is 59 mol % or higher and the content NiO is 7 mol % or higher as the Comparative examples 11 and 12, the B-H loop is a perminvar shape and this tendency is remarkable. Although the saturation magnetic flux density Bs (100° C.) is high, the coercive forth Hc is large, whereby R is 400 or lower, and the power loss is rapidly increased. If $Fe_2O_3$ is less than 53 mol %, a desired saturation magnetic flux density Bs cannot be obtained. If NiO content is 0 to 2 mol %, an addition effect for increasing the saturation magnetic flux density Bs (100° C.) is little as shown in the Comparative examples 1 and 2, and the desired characteristic cannot be provided. Therefore, NiO content should be 2 mol % or higher. Specifically, 4 mol % or higher is preferable, and the characteristic of the saturation magnetic flux density Bs (100° C.) remarkably heightens and the R-value is also large. At 4 to 6 mol %, the R-value is maximum, and at other ranges it goes down.

In the ranges where the content of ZnO is 4 mol % or lower as the Comparative example 4, although the saturation magnetic flux density Bs (100° C.) is high, the coercive forth Hc is large, whereby the R-value is lower, and a preferable DC pre-magnetization is not available, and the characteristic of the low power loss cannot be obtained. In the range where the content of ZnO is 12 mol % or more as the Comparative example 3, the Curie temperature goes down, so that the saturation magnetic flux density Bs (100° C.) is not sufficient.

In NiMnZn based ferrite whose main components exist within the predetermined ranges but sub-components are outside of the predetermined ranges as the Comparative examples 7 to 10, grain growth is insufficient or abnormal growth is caused during the sintering procedure, the saturation magnetic flux density Bs and the value of R decrease, and the power loss rapidly increases.

If $SiO_2$ is lower than 0.005 wt % and CaO is lower than 0.008 wt %, an electric resistance decreases and the power loss is large. If $SiO_2$ exceeds 0.03 wt % and CaO exceeds 0.17 wt %, the predetermined saturation magnetic flux density Bs and low power loss are not available by the abnormal grain growth during sintering.

In particular, the sub-component P of even a small content gives an influence to the density of the sintered body. P of 0.0004 to 0.01 wt % belongs to the range of the invention. In the range where the content of P is higher than 0.01 wt % as the Comparative example 9, the grain abnormally grows during sintering and a satisfied density of the sintered body cannot be obtained, and consequently the desired saturation magnetic flux density Bs and R-value are not obtained. In the range where the content of P is lower than 0.0004 wt % as the Comparative example 10, the sintering property is insufficient and the predetermined saturation magnetic flux density Bs and R-value are not obtained.

In contrast, in NiMnZn based ferrite where main components and sub-components fall within the predetermined ranges, as the Examples 8 to 19, one or two or more of the additives are added in predetermined ranges of $Nb_2O_5$: 0.005 to 0.03 wt %, $Ta_2O_5$: 0.01 to 0.08 wt %, $V_2O_5$: 0.01 to 0.1 wt %, $ZrO_2$: 0.005 to 0.03 wt %, $Bi_2O_3$: 0.005 to 0.04 wt % and $MoO_3$: 0.005 to 0.04 wt % and the average grain size are controlled to be 6 to 25 μm, the sintered bodies of relative density being higher are obtained in comparison with those having no additives, and as a result, such characteristics are got that the coercivity Hc is small, the saturation magnetic flux density Bs is high and the R-value is high. Besides, in particular, the additives of $Nb_2O5$ and $Ta_2O5$ are effective to the decrease of the power loss.

In the ranges where the levels of these additives are lower than the predetermined ranges, the addition effect is not definite, and in the ranges more than the predetermined ones, the grain abnormally grows during sintering, and the desired saturation magnetic flux density Bs (100° C.) and low power loss cannot be provided.

Figure 3A:
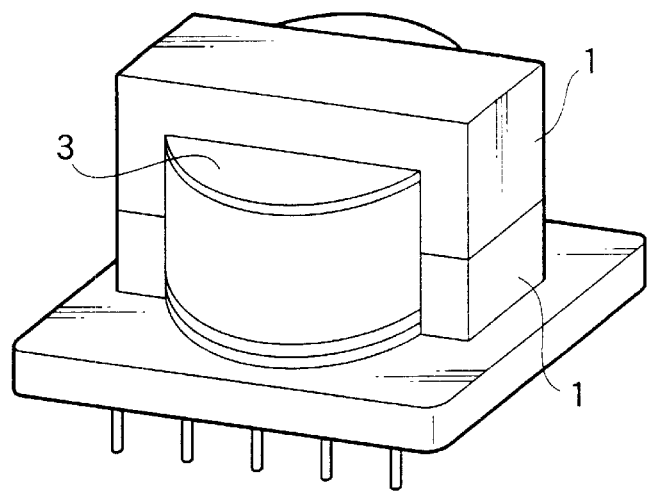
FIGS. 3A to 3C are explanatory views for transformers and choke coils.
Figure 3B:
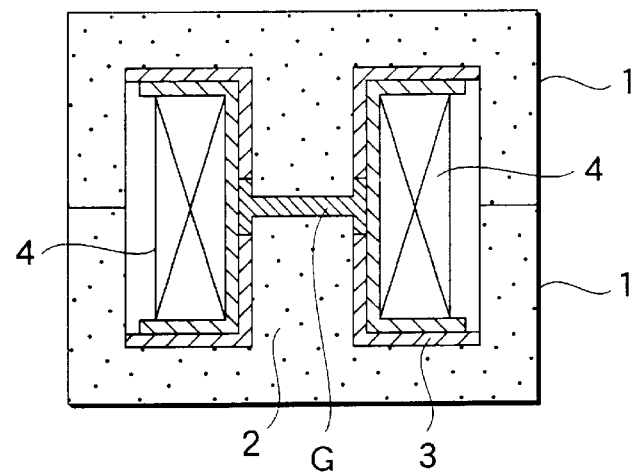
Figure 3C:
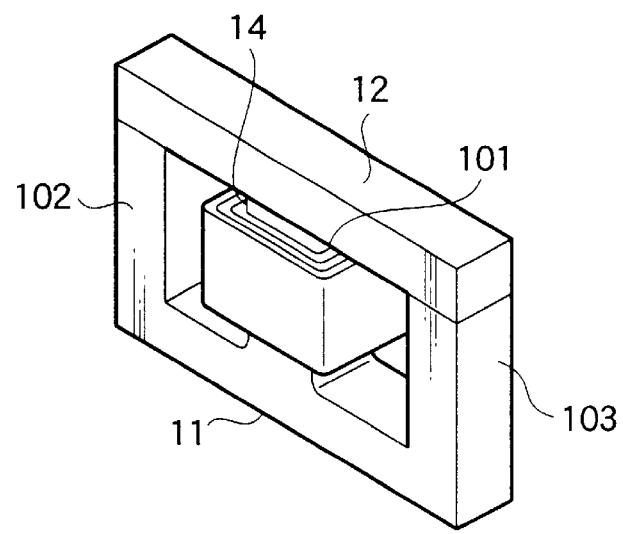

FIG. 3 is explanatory views for transformers and choke coils, in which FIG. 3A is an outer perspective view of EE type, FIG. 3B is a cross sectional view of EE type, and FIG. 3C is an outer perspective view of EI type.

In the transformer and the choke coil of FIG. 3A and FIG. 3B, a pair of E type ferrite cores 1 are opposite for composing a magnetic core, and central magnetic feet 2 are fitted with bobbins 3 wound with coils 4. A gap G between the central feet 2 is for adjusting the inductance, and may be removed.

In FIG. 3C, the E type ferrite core 11 and the I type ferrite core 12 are opposite for forming a magnetic core, and central magnetic feet 101 of the E type ferrite core 11 are wound with a coil 14.

If NiMnZn based ferrite of the invention is employed to the cores of the transformer and the chock coil, such transformers and chock coils may be served in broad temperature ranges.

In NiMnZn based ferrite, the main components range within the scope of $Fe_2O_3$=53 to 59 mol %, MnO=22 to 41 mol %, ZnO=4 to 12 mol %, and NiO=2 to 7 mol %, and the sub-components of said NiMnZn based ferrite range within the scope of $SiO_2$: 0.005 to 0.03 wt %, CaO: 0.008 to 0.17 wt % and P: 0.0004 to 0.01 wt %. Therefore, the saturation magnetic flux density Bs is 440 mT or more, and the DC pre-magnetization is excellent. Thus, the present NiMnZn based ferrite can be used in broad temperature ranges.

In NiMnZn based ferrite, the main components range within the scope of $Fe_2O_3$=53 to 59 mol %, MnO=22 to 39 mol %, ZnO=4 to 12 mol %, and NiO=4 to 7 mol %, and the sub-components of said NiMnZn based ferrite range within the scope of $SiO_2$: 0.005 to 0.03 wt %, CaO: 0.008 to 0.17 wt % and P: 0.0004 to 0.01 wt %. Therefore, the characteristic of the saturation magnetic flux density Bs is more improved and the DC pre-magnetization is excellent. Thus, the present NiMnZn based ferrite can be used in broad temperature ranges.

In NiMnZn based ferrite, at least one of the following additives are added in predetermined ranges of $Nb_2O_5$: 0.005 to 0.03 wt %, $Ta_2O_5$: 0.01 to 0.08 wt %, $V_2O_5$: 0.01 to 0.1 wt %, $ZrO_2$: 0.005 to 0.03 wt %, $Bi_2O_3$: 0.005 to 0.04 wt % and $MoO_3$: 0.005 to 0.04 wt %. Therefore, the saturation magnetic flux density Bs is 450 mT or more, and the DC pre-magnetization is more excellent. Thus, the present NiMnZn based ferrite is of the low power loss.

In the above NiMnZn based ferrite, the average grain size of a sintered body is 6 to 25 μm. Therefore, the present NiMnZn based ferrite is of the small coercivity Hc, the saturation magnetic flux density Bs of 440 mT or more, and the low power loss.

In the present NiMnZn based ferrite, the saturation magnetic flux density Bs (100° C.) of the sintered body is 440 mT or more. Therefore, the DC pre-magnetization is excellent.

In the present NiMnZn based ferrite, the relation between the saturation magnetic flux density Bs (150° C.) and the coercivity Hc (150° C.) satisfies the condition of R=(Bs−300)²/Hc, (herein R≧400). Therefore, the DC pre-magnetization is excellent where the R-value (R≧400) is a parameter.

For the transformers or the choke coils, the present NiMnZn based ferrite is used. Therefore, it is possible to produce the transformer or the choke coil having the excellent DC pre-magnetization and applicable to broad temperature ranges.

What is claimed is:

1. NiMnZn based ferrite comprising:

main components comprising iron oxide 53 to 59 mol % in term of $Fe_2O_3$, manganese oxide 22 to 41 mol % in trem of MnO, zinc oxide 4 to 12 mol % in term of ZnO, and nickel oxide 2 to 7 mol % in term of NiO; and sub-components comprising silicon oxide 0.005 to 0.03 wt % in term of SiO2, calcium oxide 0.008 to 0.17 wt % in term of CaO and phosphorus P 0.0004 to 0.01 wt %.

2. NiMnZn based ferrite as set forth in claim 1, characterized in that one or two or more of the following additives are added in predetermined ranges of $Nb_2O_5$: 0.005 to 0.03 wt %

$Ta_2O_5$: 0.01 to 0.08 wt %

$V_2O_5$: 0.01 to 0.1 wt %

$ZrO_2$: 0.005 to 0.03 wt %

$Bi_2O_3$: 0.005 to 0.04 wt % and $MoO_3$: 0.005 to 0.04 wt %.

3. NiMnZn based ferrite comprising:

main components comprising iron oxide 53 to 59 mol % in term of $Fe_2O_3$, manganese oxide 22 to 39 mol % in trem of MnO, zinc oxide 4 to 12 mol % in term of ZnO, and nickel oxide 4 to 7 mol % in term of NiO; and sub-components comprising silicon oxide 0.005 to 0.03 wt % in term of SiO2, calcium oxide 0.008 to 0.17 wt % in term of CaO and phosphorus P 0.0004 to 0.01 wt %.

4. NiMnZn based ferrite as set forth in claim 3, characterized in that one or two or more of the following additives are added in predetermined ranges of $Nb_2O_5$: 0.005 to 0.03 wt %

$Ta_2O_5$: 0.01 to 0.08 wt %

$V_2O_5$: 0.01 to 0.1 wt %

$ZrO_2$: 0.005 to 0.03 wt %

$Bi_2O_3$: 0.005 to 0.04 wt % and $MoO_3$: 0.005 to 0.04 wt %.

5. NiMnZn based ferrite as set forth in anyone of claims 1 to 4, wherein an average grain sizeof a sintered body is 6 to 25 μm.

6. NiMnZn based ferrite as set forth in claim 5, wherein saturation magnetic flux density Bs (100° C.) of sintered body is 440 mT or more.

7. NiMnZn based ferrite as set forth in claim 6, wherein the relation between the saturation magnetic flux density Bs (150° C.) and coercivity Hc (150° C.) satisfies the following condition $$R=(Bs-300)^2/Hc,$$

herein R≧400.

8. A transformer, comprising the NiMnZn based ferrite according to claim 1.

9. A transformer, comprising the NiMnZn based ferrite according to claim 3.

10. A transformer, comprising the NiMnZn based ferrite according to claim 2.

11. A transformer, comprising the NiMnZn based ferrite according to claim 4.

12. A transformer, comprising the NiMnZn based ferrite according to claim 5.

13. A transformer, comprising the NiMnZn based ferrite according to claim 6.

14. A transformer, comprising the NiMnZn based ferrite according to claim 7.

15. A choke coil, comprising the NiMnZn based ferrite according to claim 1.

16. A choke coil, comprising the NiMnZn based ferrite according to claim 3.

17. A choke coil, comprising the NiMnZn based ferrite according to claim 2.

18. A choke coil, comprising the NiMnZn based ferrite according to claim 4.

19. A choke coil, comprising the NiMnZn based ferrite according to claim 5.

20. A choke coil, comprising the NiMnZn based ferrite according to claim 6.

21. A choke coil, comprising the NiMnZn based ferrite according to claim 7.

* * * * *